United States Patent [19]

Panandiker et al.

[11] Patent Number: 5,243,011
[45] Date of Patent: Sep. 7, 1993

[54] LOW TEMPERATURE CURING, HIGH SOLIDS, LOW VOC COATING COMPOSITION

[75] Inventors: Kam P. Panandiker, Shorewood; Morris R. Olson, Minnetonka, both of Minn.

[73] Assignee: Cargill, Incorporated, Minneapolis, Minn.

[21] Appl. No.: 865,980

[22] Filed: Apr. 9, 1992

[51] Int. Cl.⁵ .............................................. C08G 18/80
[52] U.S. Cl. .................................. 528/45; 252/182.21
[58] Field of Search .................... 528/45; 252/182.21

[56] References Cited

U.S. PATENT DOCUMENTS

| | | | |
|---|---|---|---|
| 3,836,491 | 9/1974 | Taft et al. | 260/22 |
| 3,931,117 | 1/1976 | Leonard | 260/77.5 |
| 3,954,900 | 5/1976 | Schmalz et al. | 260/850 |
| 3,991,034 | 11/1976 | Takeo et al. | 260/75 |
| 4,055,551 | 10/1977 | Panandiker et al. | 260/77.5 |
| 4,151,152 | 4/1979 | Schmitt et al. | 260/33.6 |
| 4,317,894 | 3/1982 | Lewarchik et al. | 525/455 |
| 4,352,924 | 10/1982 | Wooten et al. | 528/302 |
| 4,480,008 | 10/1984 | Farronato et al. | 428/425.8 |
| 4,540,766 | 9/1985 | Chang et al. | 528/45 |
| 4,636,424 | 1/1987 | Amemiya et al. | 428/198 |
| 4,649,067 | 3/1987 | Gras | 427/388.2 |
| 4,656,211 | 4/1987 | Nasu et al. | 524/198 |
| 4,748,200 | 5/1988 | Nasu | 524/591 |
| 4,761,465 | 8/1988 | Speranza et al. | 528/45 |
| 4,781,808 | 11/1988 | Geist et al. | 204/181.7 |
| 4,794,154 | 12/1988 | Benefiel | 528/45 |
| 4,806,585 | 2/1989 | Nakayama et al. | 524/376 |
| 4,824,925 | 4/1989 | Kamarchik, Jr. et al. | 528/45 |
| 4,935,485 | 6/1990 | Pedain et al. | 528/45 |
| 4,945,149 | 7/1990 | Matsumoto et al. | 528/61 |
| 4,997,900 | 3/1991 | Brinkman | 528/45 |
| 5,028,682 | 7/1991 | Witzeman et al. | 528/45 |

OTHER PUBLICATIONS

McBride, *Lower Temperature Curing Blocked Isocyante for Use in Powder Coatings*, 65 J. Oil Col. Chem. Assoc., 257–262 (1982).

*Primary Examiner*—Maurice J. Welsh
*Attorney, Agent, or Firm*—Fitch, Even, Tabin & Flannery

[57] ABSTRACT

A low curing nonaqueous polymeric vehicle comprising a cross-linking agent and a polymer is described. The cross-linking agent is a blend of blocked tetramethylxylene diisocyanate (TMXDI) prepolymer and a blocked trifunctional trimer of hexamethylene diisocyanate or biuret of hexamethylene diisocyanate.

21 Claims, No Drawings

LOW TEMPERATURE CURING, HIGH SOLIDS, LOW VOC COATING COMPOSITION

FIELD OF THE INVENTION

This invention is directed to cross-linking polymers with a cross-linking agent which is a blend of urethane prepolymer and a polyisocyanate. More particularly this invention is directed to the cross-linking agent, a method of cross-linking a polymer with the cross-linking agent, and an organic solvent dispersible polymeric vehicle which includes the cross-linking agent. The cross-linking agent comprises a blend of blocked tetramethylxylene diisocyanate (TMXDI) prepolymer and a blocked trifunctional trimer of hexamethylene diisocyanate or biuret of hexamethylene diisocyanate.

DESCRIPTION OF THE PRIOR ART

Curable solvent based polymeric vehicles for coating binders which contain blocked isocyanate curing or cross-linking agents having long been known. Capped or blocked isocyanates have the characteristic of providing reactive cross-linking isocyanates at elevated temperatures, but also provide storage stable cross-linking agents at lower temperatures which blocked isocyanate may be mixed or dissolved with polymers with an isocyanate reactive functionality. At elevated temperatures, the isocyanate group is deblocked and made available for reaction with the reactive polymer. Hence, it is possible to produce storage stable mixtures that include polymers containing hydroxyl groups such as polyesters and isocyanates. These mixtures do not react until an elevated deblocking temperature is reached.

Cross-linking agents with isocyanate functionality for cross-linking isocyanate reactive polymers generally have been in the form of blocked prepolymers. These prepolymers are the reaction product of a di- or polyisocyanate with a diol or polyol, the prepolymer having a functionality of two or more and which reaction product then is capped or blocked by reacting the free isocyanates of the prepolymer with a blocking agent as are known in the art. U.S. Pat. No. 4,656,211 to Nasu et al. describes cross-linking agents which are blocked prepolymers. These prepolymers include the reaction product of 1,3-bis(isocyanatomethyl) cyclohexane and trimethylolpropane which polymer is blocked with methyl ethyl ketoxime; 3-isocyanatomethyl-3,5,5-trimethylcyclohexyl isocyanate reacted with trimethylolopropane and blocked with ε-caprolactam.

Using a blocked prepolymer as a cross-linking agent generally provides impact resistance not attainable by using blocked polyisocyanates by themselves without prepolymers as cross-linking agents. Using blocked prepolymers, however, often enhances impact resistance. In providing acceptable coating binders, however, the use of prepolymers frequently requires long cure times and/or high cure or cross-linking temperatures. These high cure and deblocking temperatures using a blocked prepolymer curing agent raise energy requirements for coatings and impose problems in coating substrates which are sensitive to the elevated temperatures which are required to deblock and cure the polymeric vehicle into an acceptable coating binder.

Another problem in using a polymeric vehicle which includes a prepolymer as a cross-linking agent is to minimize the volatile organic compounds (VOCs) used in the coating composition. Indeed the U.S. Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere. One approach to reduce VOCs is to reduce the use of organic solvents by having a high solids content in the coating composition with a corresponding reduction of VOCs and use of organic solvents.

An object of this invention is to provide a cross-linking agent for an organic solvent dispersible polymeric vehicle which cross-linking agent is shelf stable and has a low cure temperature.

It is another object of this invention to provide a high solids, low VOC formulated coating composition which is shelf stable and which will provide a durable cured coating binder in short times at low curing temperatures.

It is still another object of this invention to provide a method of cross-linking a polymer with active hydrogens at low curing temperatures using a cross-linking agent which includes a blocked TMXDI prepolymer.

These and other objects of the invention will be found by reference to the following description.

SUMMARY OF THE INVENTION

The invention provides a cross-linking agent, a polymeric vehicle, a formulated coating composition and a method for cross-linking a polymeric vehicle which includes a polymer having an active hydrogen which is reactive with the cross-linking agent at low cure temperatures. According to the invention, the cross-linking agent comprises a blend of a blocked prepolymer and blocked polyisocyanate in a ratio of from about 10:1 to about 1:10 blocked prepolymer to blocked polyisocyanate. The prepolymer is the reaction product of the tetramethylxylene diisocyanate and a polyol. The prepolymer is blocked with a blocking agent selected from the group consisting of methyl ethyl ketoxime and diisobutyl ketoxime to provide a blocked prepolymer having a Gardner-Holt viscosity of not greater than about X to about Y. The polyisocyanate in the blend is selected from the group consisting of a trimer of hexamethylene diisocyanate and the biuret of hexamethylene diisocyanate which is blocked with the blocking agent described above.

According to the invention, the cross-linking agent is combined with a polymer with an active hydrogen in an amount effective to provide a polymeric vehicle which will cure at temperatures as low as about 260° F. in about 30 minutes and provide upon curing an impact resistance (direct/reverse) of at least about 160/120 and a pencil hardness of at least about H. The polymeric vehicle of the invention when combined with non-aqueous solvents provides a high solids, low VOC formulated coating composition which will cure at temperatures as low as 260° F. in about 30 minutes.

The invention also provides a method for cross-linking a polymeric vehicle at temperatures as low as 260° F. by combining the cross-linking agent with a polymer having an active hydrogen reactive with the cross-linking agent.

The invention provides coating binders which result from low temperature cures of a non-aqueous formulated coating composition. The formulated coating composition has low VOCs and high solids. The low temperature cures of the polymeric vehicle and formulated coating composition of the invention advantageously provide energy savings, shorter curing times, shelf stability and permit film formation on temperature sensitive substrates.

DETAILED DESCRIPTION OF THE INVENTION

As used in this application, "polymeric vehicle" means all polymeric and resinous components in a formulated coating, i.e., before film formation, including but not limited to polymers and cross-linking agents. "Coating binder" means the polymeric part of the film of the coating after solvent has evaporated and after cross-linking. "Formulated coating" means the polymeric vehicle and solvents, pigments, catalysts and additives which may optionally be added to impart desirable application characteristics to the formulated coating and desirable properties such as opacity and color to the film. "Film" is formed by application of the formulated coating to a base or substrate, with subsequent evaporation of solvent and cross-linking.

As used in this application, "polymer" means a polymeric or oligomeric component of a polymeric vehicle such as a polyester polymer, alkyd polymers being considered to be a sub-class of polyester polymers. "Cross-linking agent" means a blend as described herein which blend after deblocking contains isocyanate groups that are capable of forming covalent bonds with active hydrogens on the polymers. "Active hydrogen" or "polymers with active hydrogens" are polymers with isocyanate reactive groups which include groups with hydrogen bonded to nitrogen such as amines and amides, alcohols and carboxylic acids. An important aspect of this invention includes cross-linking polymers such as acrylic polymers and polyester polymers with hydroxyl functionality.

"Acrylic polymer" means a polymer or copolymers of:

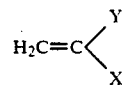

wherein
y = alkyl having 1 to 4 carbon atoms or H;
x =

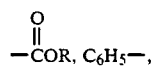

tolyl,

R = straight chain or branched alkyls having 1 to 12 carbons,

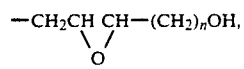

H,

2-hydroxy ethyl, 3-chloro-2-hydroxypropyl, 2-hydroxy-1-methylethyl, 2-hydroxypropyl, 3-hytdroxypropyl, 2,3-dihydroxypropyl, 2-hydroxybutyl, 4-hydroxybutyl, diethyleneglycol, 5-hydroxypentyl, 6-hydroxyhexyl, triethyleneglycol, 7-hydroxyhexyl, 3,4-dihydroxybutyl, 5-hydroxypentyl, 6-hydryoxyhexyl, 1,3-dimethyl-3-hydroxybutyl, 5,6-dihydroxyhexyl, 7-hydroheptyl;
R' = H
n = 2 to 7.

"Polyester" or "polyester polymer" means the polymerized reaction product of polyacids and polyols or an acid with a hydroxyl functionality such as parahydroxy benzoic acid with itself or a polyol. Polyacids include diacids such as isophthalic, terephthalic, and fumaric acids and $HOOC(CH_2)_nCOOH$ where n = 2 or more and "dimer acids", anhydrides of diacids such as maleic, phthalic, hexahydrophthalic, and succinic, and anhydrides of polyacids such as trimellitic acid anhydride. In the invention, however, the acrylic polymer and the polyester polymer to react with the cross-linking agent must be substituted such that these polymers must have an active hydrogen.

As used herein, "diisocyanate" means an isocyanate compound with two isocyanate groups. Polyisocyanate means an isocyanate compound with more than two isocyanate groups. Urethane prepolymer means a compound which is the reaction product of a di- or polyisocyanate with a compound containing an active hydrogen reactive with an isocyanate which reaction product thereafter has reactive isocyanates blocked with blocking agents or is further reacted with a polymer through reactive isocyanates and active hydrogens.

In this application, TMXDI may be meta or para tetramethylxylene diisocyanate:

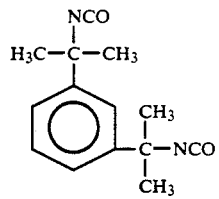   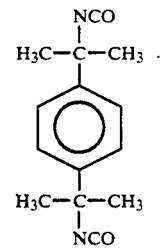

m-TMXDI    p-TMXDI

In this application, the trimer of HMDI means the polyfunctional hexamethylene diisocyanate which has the general formula:

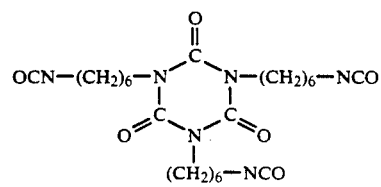

the biuret of HMDI has the general formula shown below:

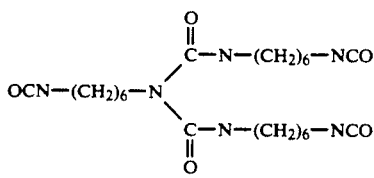

the biuret may be made by reacting water with HMDI as is known.

The invention provides a new cross-linking agent for a polymer with an active hydrogen which is reactive with an isocyanate group (—N=C=O). The cross-linking agent is a blend of a blocked urethane prepolymer and a blocked polyisocyanate compound, the blocked prepolymer to blocked polyisocyanate ratio in the range of from about 10:1 to about 1:10 and preferably in the range of from about 2:1 to about 1:2.

The urethane prepolymer is the reaction product of TMXDI and a polyol polyester or a polyol such as polycaprolactone polyol (tone polyol), trimethylol propane, trimethylol ethane, neopentyl glycol (NPG), cyclohexanedimethanol (CMDM), trimethyl propanediol (TMPD), 1,4 butanediol and trishydroxyethylisocyanurate (THEIC) with tone polyol being preferred. Tone polyol is commercially available from Union Carbide corporation as Tone polyol 0305. The polyol polyester or polyol is reacted with the TMXDI to provide the prepolymer which should have a Gardner-Holt viscosity not in excess of from about X to about Y. If the prepolymer is the reaction product of a polyol having more than two hydroxyl groups, the prepolymer should have at least about 10 weight percent free isocyanate (—N=C=O) groups The urethane prepolymer is blocked with methyl ethyl ketoxime (MEKO), diisobutyl ketoxime or mixtures thereof. The use of TMXDI, MEKO and/or diisobutyl ketoxime are important to the invention. The prepolymer may be made by reacting the polyol with TMXDI at about 190° F. over several hours using dibutyl tin dilaurate catalyst until the amount of isocyanate in the reaction vessel remains constant over about 30 minutes.

In the invention, the blocked polyisocyanate compound is the blocked trimer of HMDI or the blocked biuret of HMDI which compounds are blocked with MEKO or diisobutyl ketoxime. The prepolymer made with the TMXDI may be blended with the HMDI trimer or biuret HMDI which blend then is blocked with MEKO or diisobutyl ketoxime. Alternatively, the prepolymer and HMDI (or biuret of HMDI) may be blocked separately from the prepolymer. Thereafter, the blocked prepolymer and blocked HMDI trimer or biuret are blended. The prepolymer and the HMDI trimer or biuret may be blocked by reacting the prepolymer or HMDI trimer or biuret with the blocking agent in an exothermic reaction using a solvent such as methyl amyl ketone, amyl acetate or methyl isoamyl ketone. When a polyol having more than two hydroxyls is used to make the prepolymer, preferably, prior to blocking, the prepolymer has a content of free isocyanate groups of between about 10 and about 11 weight percent. Thereafter, sufficient blocked HMDI trimer or blocked biuret HMDI should be blended with the prepolymer to provide the blend with a content of free isocyanate groups of at least about 16 percent prior to blocking or after deblocking. The blend of prepolymer and polyisocyanate will have a viscosity in the range of from about Y to about $Z_1$.

The polymeric vehicle of the invention is a blend of the cross-linking agent and polymer with active hydrogen. The polymeric vehicle of the invention comprises the cross-linking agent in an amount effective for reacting with the active hydrogen on the polymer and to provide a coating binder which cures at temperatures as low as 260° F. for curing times of at least about 30 minutes. The properties of the resulting film may vary as a function of the type of polymer used with the cross-linking agent, but polymeric vehicles comprising polymers with an active hydrogen and the cross-linking agent will provide films having a thickness of 1 mm with a hardness of at least about H and an impact resistance (direct/reverse) of at least about 160/120.

The formulated coating compositions of the invention include the polymeric vehicle in a non-aqueous solvent. Non-aqueous solvent and formulated coating composition means that the solvent and/or formulated coating composition do not have more than about 0.2 weight percent water, and except for impurities, are regarded as free of water. The formulated coating composition of the invention is a nonaqueous, high solids, low VOC composition.

"VOC" means volatile organic compounds and "low VOC" means about 3.5 pounds per gallon or about 420 grams of volatile organic compounds per liter of formulated coating composition. "Volatile organic compounds" are defined by the U.S. Environmental Protection Agency as any organic compound which participates in atmospheric photochemical reactions, except for specific designated compounds which have negligible photochemical activity. Water is not a VOC. The following compounds generally have been designated as VOCs. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylester-sulphuric acid, dimethyl-butanone, pentachloroethane, trichlorotrifluoroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethene, 2,3-dimethylbutane, tetrachloroethane, dimethyl-3-methylene-bicyclo-heptane, A-pinene, hexachlorobutadiene, methylnaphthalene, naphthalene, quinoline, methylnaphthalene, phenylpropanone, dimethylbenzene, o-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-metnylpyridine, pentene, 1-pentane, bromochloro-propane, 1H-pyrrole, tetrahydrofuran, hexane, 1,4-dichlorobutane, cyclohexane, cyclohexene, pyridine, octane, 1-ocetene, nonane, dodecane, propene, 2-methyl-1-nentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dimethyl-methylene-bicyclo-heptane, 1,2-diethylbenzene, (1-methylpropyl)-benzene, Acetic Acid ethyl-ester, 1,3-diethylbenzene, cyclopentene, heptane, cis-dichloroethene, trans-dichlorothene, cyclopentane, cycloheptane, 1,2-propandiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclopentasiloxane, 1,3-dichlorobenzene, hexadecane, 2-methylthiophene, 3,3-dimethylpentane, 3-methyl-1-butene, 2-methyl-1-butene, 2,2,3-trimethyl pentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-hepane, (E)-2-heptene, 4-methylnonane, tetrachlorobenzene, butene, chloronirobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benezenedicarboxal-dehyde, benzoyl nitro peroxide, bromochloropropane, dibromochloro-propane, pentachloro-butadiene, dibromochloropropene, 2-butoxyethanol, bromopentachloro ethane, tetradecamethyl-cycloheptasiloxane, trimethylpentanedio, dodecamethylcyclo-hexasil-oxane, hexamethylcyclotrisiloxane, octamethylcyclo-tetrasiloxane, hexadecamethylcyclo-octasil-oxane, tridecane, and tetradecane.

The low VOC formulated coating composition of the invention has sufficient solvent to disperse the polymeric vehicle such that it may be applied to a substrate such as by spraying. Generally, the Gardner-Holt viscosity of the formulated coating composition of the invention will be in the range of from about D to about H. The formulated coating compositions are low VOC in that they will not have more than about 3.5 pounds per gallon of VOCs, but generally the formulated coating composition of the invention will have VOCs in the range of from about 2.8 to about 3.5 pounds per gallon of formulated coating composition. The low VOC formulated coating composition of the invention is a high solids composition because it has at least about 65 weight percent non-volatiles, and preferably from about 70 to about 100 weight percent non-volatiles. The formulated coating composition of the invention is a nonaqueous solvent system which uses an organic solvent as distinguished from an aqueous system or a powder coating composition.

The method of the invention is the use of cross-linking agent to cure a polymeric vehicle into a coating binder at temperatures as low as 260° F. in periods of time as short as about 30 minutes. The method will provide completed cured films having the minimum properties as indicated below:

| | |
|---|---|
| Impact resistance: | 160/120 |
| Hardness: | H |
| Cure Time: | Periods as short as thirty (30) minutes cure time at 260° F. or less to provide a coating binder which will withstand about 100 rubs of methyl ethyl ketone solvent. |

The following examples set forth exemplary methods of making the cross-linking agent polymer vehicle and formulated coating compositions of the invention.

EXAMPLE A

Cross-Linking Agent

Blend of MEKO blocked TMXDI Prepolymer and MEKO blocked HMDI Biuret

The following ingredients are mixed and reacted as described below:

| Ingredient | Weight (grams) |
|---|---|
| Methyl isoamyl ketone [(MIAK(1))] | 192.2 |
| TMXDI | 268.4 |
| Dibutyl tin dilaurate (DBTDL) | 0.5 |
| polycaprolactone polyol (Tone 0305 polyol from Union Carbide Corporation) | 180.0 |
| Biuret HMDI (Des N-100 which contains no solvent and is commercially available from Mobay Chemical Company) | 480.0 |
| Butyl acetate | 146.0 |
| MIAK (2) | 457.0 |
| Methyl ethyl ketoxime | 294.0 |
| MIAK (3) | 126.0 |

The MIAK(1), TMXDI and DBTDL are charged into a reaction vessel and the Tone 0305 is added over about 1½ hours with slow heating of 140° F. The 140° F. is held for about two hours, then the temperature is brought to 190° F. in about five minutes although this amount of time is not critical. Thereafter the reaction is allowed to cool, the Des N-100, butyl acetate and MIAK (2) are added. Thereafter the MEKO and MIAK (3) are added with cooling. The resulting cross-linking agent has the following properties:

| | |
|---|---|
| viscosity | Y + ¼ |
| color | 2— |
| % NCO | <0.2 |
| wt./gal. | 8.53 |
| % Nonvolatiles | 70.0 |

EXAMPLE B

Cross-Linking Agent

Blend of Blocked TMXDI and HMDI Biuret

The following ingredients are mixed and reacted as described below.

| Ingredient | Weight (grams) |
|---|---|
| Methyl isoamyl ketone [(MIAK(1))] | 200.0 |
| TMXDI | 472.4 |
| Biuret HMDI (Des N-751 which contains no solvent and is commercially available from Mobay Chemical Company) | 944.8 |
| MIAK (2) | 12.0 |
| Methyl ethyl ketoxime | 650.0 |

The MIAK(1), TMXDI and Des-N751 are charged into a reaction vessel and the MEKO is added over about 2 hours with slow heating to 180° F. The 180° F. is held for about two hours, then the temperature is brought to 190° F. Thereafter the reaction is allowed to cool and the MIAK(2) is added. The resulting cross-linking agent has the following properties:

| viscosity | Z + 5 sec |
|---|---|
| color | <1 |
| % NCO | <0.12 |
| wt./gal. | 8.76 |
| % Nonvolatiles | 80.0 |

EXAMPLE C

Cross-Linking Agent

Blend of Blocked TMXDI Prepolymer and Blocked Trimerized HMDI

| Ingredient | Weight (grams) |
|---|---|
| MIAK (1) | 192.2 |
| TMXDI | 268.4 |
| DBTDL | 0.5 |
| Tone 0305 polyol | 175.0 |
| HMDI trimer (Commercially available as Des N-3390 from Mobay Chemical company) | 485.0 |
| MIAK (2) | 149.0 |
| MEKO | 290.0 |

The 0305 Tone polyol is slowly charged over two hours into a reactor having MIAK, TMXDI and DBTDL which is heated to about 120° F. The reaction mixture heated for two hours at 140° F.; thereafter, the mixture is heated to 190° F. for 3½ hours. After the 3½ hours heating the HMDI trimer is added with cooling to 100° F., which is followed by the addition of MIAK (2) and MEKO at about 100° F. The latter mixture reacts at about 120° F. for about 45 minutes in an exothermic reaction.

The reaction product has the following properties:

| viscosity | Z + 1 sec. |
|---|---|
| % NCO | <0.1 |
| wt./gal. | 8.65 |
| color | 1+ |
| % Nonvolatiles | 75.2 |

EXAMPLE D

Cross-Linking Agent

Blocked TMXDI Prepolymer and Blocked Trimerized HMDI Blend

The following ingredients are reacted as described in Example C:

| Ingredient | Weight (grams) |
|---|---|
| MIAK (1) | 192.2 |
| TMXDI | 268.4 |
| DBTDL | 0.5 |
| Tone 0305 | 175.0 |
| Trimerized HMDI (HDT 90 from Rhone-Poulenc) | 477.0 |
| MIAK (2) | 148.0 |
| MEKO | 288.0 |

EXAMPLE E

Cross-Linking Agent

Blend of Blocked TMXDI and Blocked HMDI Trimer

The following ingredients are related as described below.

| Ingredient | Weight (grams) |
|---|---|
| MIAK (1) | 150.0 |
| HMDI Trimer (Des N-3390) | 590.5 |
| TMXDI | 354.3 |
| MEKO | 490.0 |
| MIAK (2) | 135.0 |

The MIAK (1), Des N-3390 and TMXDI are charged into a reactor and heated to 70° F. and held for about 15 minutes. Thereafter, 100 g of MEKO is added over 15 minutes and the temperature is raised to 120° F. and another 100 g of MEKO is added over 15 minutes. Thereafter the temperature increased to 140° F. With cooling add the remainder of the MEKO over one hour at about 140° F. Thereafter, the temperature is raised to about 170° F. for about 45 minutes. The reactor mixture is then cooled and filtered and exhibits the following properties.

| viscosity | X + 1 sec |
|---|---|
| color | <1 |
| % NCO | <0.1 |
| % N.V. | 80.1 |
| wt./gal. | 8.76 |

EXAMPLE F

Cross-Linking Agent

Blend of Blocked TMXDI and Blocked HMDI Trimer

The following ingredients are related as described below.

| Ingredient | Weight (grams) |
|---|---|
| MIAK (1) | 150.0 |
| HMDI Trimer (HDT-90) | 590.5 |
| TMXDI | 354.3 |
| MEKO | 491.0 |
| MIAK (2) | 135.0 |

The MIAK (1), HDT-90 and TMXDI are charged into a reactor and heated to 70°A F. and held for about 15 minutes, Thereafter, 100 g of MEKO is added over 15 minutes and the temperature is raised to 120° F. and another 100 g of MEKO is added over 15 minutes. Thereafter the temperature increases to 140° F. With cooling add the remainder of the MEKO over one hour at about 140° F. Thereafter, the temperature is raised to about 170° F. for about 45 minutes. The reactor mixture is then cooled and filtered and exhibits the following properties.

| | |
|---|---|
| viscosity | X + 2 sec |
| color | <1 |
| % NCO | <0.1 |
| % N.V. | 80.0 |
| wt./gal. | 8.75 |

EXAMPLE G (Comparison)

Cross-Linking Agent

A blocked prepolymer of IPDI and a polyol, commercially available as product 5797 from Cargill, Incorporated, Minneapolis, Minn., is blended with a biuret of HMDI blocked with MEKO.

comparisons-Prepolymer Cross-Linking Agents Polymeric Vehicles

Polymeric vehicles A through G using a hydroxyl containing polyester were made with the cross-linking agents of Examples A through G. The hydroxyl containing polyester was Resin No. 5776, commercially available from Cargill, Incorporated, Minneapolis, Minn., having 85% solids by weight, a viscosity of Z4 and a hydroxyl value of about 175 was blended with each of the cross-linking agents as described below. Polymeric vehicles A, C and D are exemplary of the invention; polymeric vehicles B, E, F and G are comparative examples. The polymeric vehicles were mixed with the indicated cross-linking agent.

| | A (Invention) |
|---|---|
| Ingredients | Polyester + Cross-Linker Agent Comprising Blend Blocked TMXDI Prepolymer and Blocked HMDI Biuret From Example A |
| Weight Ratio of Polyester:Cross-Linker | 47.5:52.5 |
| VOC (lbs./gal.) | |
| Theoretical | 3.03 |
| Actual | 3.22 |
| Viscosity (#4 Zahn) | 17" |
| | B (Invention) |
| Ingredients | Polyester + Blend of Blocked TMXDI and Blocked HMDI Trimer From Example B |
| Weight Ratio of Polyester:Cross-Linker | 56.6:43.4 |
| VOC (lbs./gal.) | |
| Theoretical | 3.00 |
| Actual | 3.33 |
| Viscosity (#4 Zahn) | 14" |

-continued

| | C (Invention) |
|---|---|
| Ingredients | Polyester + Cross-Linking Agent Comprising Blend of Blocked TMXDI and Blocked Trimerized HMDI From Example C |
| Weight Ratio of Polyester:Cross-Linker | 47.8:52.2 |
| VOC (lbs./gal.) | |
| Theoretical | 3.00 |
| Actual | 3.22 |
| Viscosity (#4 Zahn) | 17" |
| | D (Invention) |
| Ingredients | Polyester + Cross-Linking Agent Comprising Blend of MEK Blocked TMXDI of Prepolymer and Blocked TMXDI Trimer From Example D |
| Weight Ratio of Polyester:Cross-Linker | 47.8:52.2 |
| VOC (lbs./gal.) | |
| Theoretical | 3.00 |
| Actual | 3.20 |
| Viscosity (#4 Zahn) | 17" |
| | E |
| Ingredients | Polyester + Cross-Linking Agent Comprising Blend of MEKO Blocked TMXDI and MEKO Blocked Trimerized HMDI, from Example E |
| Weight Ratio of Polyester:Cross-Linker | 56.5:43.5 |
| VOC (lbs./gal.) | |
| Theoretical | 3.00 |
| Actual | 3.32 |
| Viscosity (#4 Zahn) | 12" |
| | F |
| Ingredients | Polyester + Cross-Linking Agent Comprising Blend of MEKO Blocked TMXDI and Trimerized HMDI From Example F |
| Weight Ratio of Polyester:Cross-Linker | 56.5:43.5 |
| VOC (lbs./gal.) | |
| Theoretical | 3.00 |
| Actual | 3.29 |
| Viscosity (#4 Zahn) | 12" |
| | G |
| Ingredients | Polyester + Cross-Linking Agent of Example G |
| Weight Ratio of Polyester:Cross-Linker | 47.4:52.6 |
| VOC (lbs./gal.) | |
| Theoretical | 3.00 |
| Actual | 3.18 |
| Viscosity (#4 Zahn) | 18" |

Properties of Coating Binders From Polymeric Vehicles A Through G

Polymeric vehicles A through G were cast on steel panels and baked for 20 minutes at 320° F. After baking the coating binders A through G the panels exhibited the properties shown below.

| | A | B | C | D | E | F | G |
|---|---|---|---|---|---|---|---|
| VOC (LBS/GAL) | | | | | | | |
| Theoretical: | 3.03 | 3.00 | 3.00 | 3.00 | 3.00 | 3.00 | 3.00 |
| Actual: | 3.22 | 3.33 | 3.22 | 3.20 | 3.32 | 3.29 | 3.18 |
| VISCOSITY (#4 ZA): | 17" | 14" | 17" | 17" | 12" | 12" | 18" |
| PENCIL HARDNESS: | 2H | 2H | 2H | 2H | 2H | 2H | 2H |
| IMPACT D/R: | 160/150 | 160/120 | 160/130 | 160/160 | 160/120 | 160/110 | 160/90 |
| ADHESION CRS: | 100% | 100% | 100% | 100% | 100% | 100% | 100% |
| SALT SPRAY - 193 HRS: | | | | | | | |
| Scribe Creep: | 1/8" | 1/8" | 1/8" | 1/8" | 1/8" | 1/8" | 1/8" |
| Scribe Blisters: | MOD #9 | SLIGHT #8 | SLIGHT #8 | SLIGHT #6 | V. SLIGHT #8 | V. SLIGHT #8 | V. SLIGHT #8 |

-continued

|  | A | B | C | D | E | F | G |
|---|---|---|---|---|---|---|---|
| Scribe Corro: | MOD | MOD | MOD | MOD | MOD | MOD | MOD |
| Surface Blis: | NONE | NONE | NONE | NONE | NONE | NONE | NONE |
| Surface Corr: | NONE | NONE | NONE | NONE | NONE | NONE | NONE |
| HUMIDITY - 306 HR | NONE | V. SLIGHT #8 | NONE | NONE | NONE | NONE | NONE |
| QUV DURABILITY UVB 313 (60/20): | | | | | | | |
| Initial: | 30/65 | 93/81 | 93/79 | 92/73 | 93/74 | 92/77 | 91/72 |
| 71 Hours: | 83/48 | 89/67 | 91/73 | 85/58 | 89/66 | 90/70 | 85/58 |
| 166 Hours: | 23/47 | 84/50 | 87/62 | 86/54 | 88/63 | 91/68 | 84/54 |
| 238 Hours: | 66/18 | 76/29 | 86/54 | 82/44 | 86/54 | 88/56 | 69/19 |
| 330 Hours: | 71/24 | 84/48 | 88/63 | 83/48 | 88/59 | 84/51 | 73/28 |
| 472 Hours: | 60/13 | 70/27 | 85/53 | 78/37 | 81/45 | 67/27 | 53/08 |
| 647 Hours: | 46/07 | 52/09 | 77/34 | 61/13 | 70/26 | 41/04 | 33/00 |
| 998 Hours: | 23/00 | 20/00 | 53/07 | 38/01 | 39/01 | 22/00 | 20/00 |
| 1306 Hours: | 17/00 | 18/00 | 49/06 | 29/00 | 25/00 | 19/00 | 23/00 |
| 1660 Hours: | 14/00 | 18/00 | 29/00 | 18/00 | 20/00 | 16/00 | 24/00 |

The ability of the polymeric vehicles A through G to cure in short times at low temperatures was tested by casting the polymeric vehicle on steel panels and determining the time and temperature for the curing required to permit the coating binder to withstand 100 rubs with methyl ethyl ketone. As used herein, low temperature curing in respect to a polymeric vehicle is a polymeric vehicle which will provide a coating binder or film that will withstand 100 MEK rubs after curing at not more than about 260° F. for not more than 30 minutes. The results are shown below.

| EXTENT OF CURE MEASURED BY THE AMOUNT OF TIME (MINUTES) IT TAKES TO PASS 100 MEK RUBS | | | | | | | |
|---|---|---|---|---|---|---|---|
| TEMP. (F.) | A | B | C | D | E | F | G |
| 250 | — | — | — | — | — | — | — |
| 260 | 30 | — | 30 | 30 | 30 | — | — |
| 270 | 30 | 25 | 30 | 22 | 22 | 30 | 30 |
| 280 | 17 | 20 | 17 | 17 | 14 | 14 | 20 |
| 290 | 13 | 13 | 15 | 13 | 13 | 15 | 18 |

As can be seen from the above, polymeric vehicles which include the blend of blocked prepolymer and blocked polyisocyanate according to the invention exhibit a consistency in curing at lower temperatures and shorter times compared to the other polymeric vehicle systems.

Although the invention has been described with regard to its important features and preferred embodiments, it should be understood that various changes and modifications as would be obvious to one having ordinary skill in this art may be made without departing from the scope of the invention which is set forth in the claims appended hereto.

The various features of this invention which are believed to be new art set forth in the following claims.

What is claimed is:

1. A cross-linking agent for a polymer having an active hydrogen reactive with the cross-linking agent in a non-aqueous solvent, the cross-linking agent comprising a blend of a blocked prepolymer compound and blocked polyisocyanate compound in a ratio in the range of from about 10:1 to about 1:10 blocked prepolymer to blocked polyisocyanate, the blocked prepolymer compound being a prepolymer compound blocked with a blocking agent, the prepolymer compound being a reaction product of tetramethylxylene diisocyanate and a polyol and having a Gardner-Holt viscosity of not greater than about X to about Y, the prepolymer compound being blocked with a blocking agent to provide the blocked prepolymer compound, the blocking agent being selected from the group consisting of methyl ethyl ketoxime and diisobutyl ketoxime,
the polyisocyanate compound being blocked with the blocking agent to provide the blocked polyisocyanate compound, the polyisocyanate compound being selected from the group consisting of the trimer of hexamethylene diisocyanate and the biuret of hexamethylene diisocyanate.

2. The cross-linking agent as recited in claim 1 wherein the blocking agent is methyl ethyl ketoxime.

3. The cross-linking agent as recited in claim 1 wherein the polyol is selected from the group consisting of polycaprolactone polyol, dimethylol propane, trimethylol ethane, neopentyl glycol, cyclohexanedimethanol, trimethyl propanediol, 1,4 butanediol and trishydroxyethylisocyanurate.

4. A cross-linking agent as recited in claim 2 wherein the polyol is selected from the group consisting of polycaprolactone polyol, dimethylol propane, trimethylol ethane, neopentyl glycol, cyclohexanedimethanol, trimethyl propanediol, 1,4 butanediol and trishydroxyethylisocyanurate.

5. A cross-linking agent as recited in claim 1 wherein the polyol has more than two hydroxyl groups and the prepolymer compound has more than about 10 weight percent free isocyanate groups before it is blocked with the blocking agent.

6. A cross-linking agent as recited in claim 4 wherein the polyol has more than two hydroxyl groups and the prepolymer compound has more than about 10 weight percent free isocyanate groups before it is blocked with the blocking agent.

7. A high solids, non-aqueous, formulated coating composition having a low volatile organic compound content, the formulated coating composition comprising:
a cross-linking agent and a polymer having an active hydrogen, the cross-linking agent being in an amount effective to react with the active hydrogen of the polymer, the cross-linking agent comprising a blend of blocked prepolymer compound and blocked polyisocyanate compound in a ratio in the range of from about 10:1 to about 1:10 blocked prepolymer compound to blocked polyisocyanate compound, the blocked prepolymer compound being a prepolymer compound blocked with a blocking agent, the prepolymer compound being a reaction product of a tetramethylxylene diisocyanate and a polyol and having a Gardner-Holt viscosity of not greater than about X to about Y, the prepolymer compound being blocked with a blocking agent to provide the blocked prepolymer compound, the blocking agent being selected from the group consisting of methyl ethyl ketoxime and diisobutyl ketoxime, the polyisocyanate compound being blocked with the blocking agent to provide the blocked polyisocyanate compound, the polyisocyanate compound being selected from the group consisting of the trimer of hexamethylene diisocyanate and the biuret of hexamethylene diisocyanate.

8. The formulated coating composition as recited in claim 7 wherein the blocking agent is methyl ethyl ketoxime.

9. The formulated coating composition as recited in claim 7 wherein the polyol is selected from the group consisting of polycaprolactone polyol, dimethylol propane, trimethylol ethane, neopentyl glycol, cyclohexanedimethanol, trimethyl propanediol; 1,4 butanediol and trishydroxyethylisocyanurate.

10. The formulated coating composition as recited in claim 7 wherein the composition does not have more than 3.5 pounds/gallon of volatile organic compounds and a solvent, the formulated coating composition comprising not more than about 0.2 weight percent weight based upon the weight of the solvent.

11. The formulated coating composition as recited in claim 9 wherein the composition includes a solvent and does not have more than 3.5 pounds/gallon of volatile organic compounds, the formulated coating composition comprising not more than about 0.2 weight percent water based upon the weight of the composition.

12. The formulated coating composition as recited in claim 7 wherein the polymer is a polyester and the formulated coating composition provides a coating binder after curing at a temperature of not greater than 260° F. for not more than 30 minutes.

13. The formulated coating composition as recited in claim 11 wherein the polymer is a polyester and the formulated coating composition provides a coating binder after curing at a temperature of not greater than 260° F. for not more than 30 minutes.

14. A low temperature curing polymeric vehicle comprising a cross-linking agent and a polymer having an active hydrogen, the cross-linking agent being in an amount effective to react with the active hydrogen of the polymer to provide a 1 mm thick film with a hardness of about H and an impact resistance (direct/reverse) of at least about 160/120 after curing at a temperature of not greater than 260° F. for not more than about 30 minutes, the polymeric vehicle comprising:

a blend of a blocked prepolymer compound and a blocked polyisocyanate compound in a ratio in the range of from about 10:1 to about 1:10 blocked prepolymer compound to blocked polyisocyanate compound, the blocked prepolymer compound being a prepolymer blocked with a blocking agent, the prepolymer compound being a reaction product of tetramethylxylene diisocyanate and a polyol and having a Gardner-Holt viscosity of not greater than about X to about Y, the prepolymer compound being blocked with a blocking agent to provide the blocked prepolymer compound, the blocking agent being selected from the group consisting of methyl ethyl ketoxime and diisobutyl ketoxime, the polyisocyanate compound being blocked with the blocking agent to provide the blocked polyisocyanate compound, the polyisocyanate compound being selected from the group consisting of the trimer of hexamethylene diisocyanate and the biuret of hexamethylene diisocyanate.

15. The polymeric vehicle as recited in claim 14 wherein the blocking agent is methyl ethyl ketoxime.

16. The polymeric vehicle as recited in claim 14 wherein the polyol is selected from the group consisting of polycaprolactone polyol, dimethylol propane, trimethylol ethane, neopentyl glycol, cyclohexanedimethanol, trimethyl propanediol, 1,4 butanediol and trishydroxyethylisocyanurate.

17. The polymeric vehicle as recited in claim 16 wherein the blocking agent is methyl ethyl ketoxime and the polymer is a polyester.

18. A method for cross-linking a polymer having an active hydrogen in a nonaqueous blend of cross-linking agent and the polymer having the active hydrogen, the method comprising:

reacting the polymer with the cross-linking agent which cross-linking agent is in an amount effective to react with the active hydrogen of the polymer to provide a 1 mm thick film with a hardness of about H after curing at a temperature of not greater than 260° F. for not more than 30 minutes, the cross-linking agent comprising a blend of blocked prepolymer compound and blocked polyisocyanate compound in a ratio in the range of from about 10:1 to about 1:10 blocked prepolymer compound to blocked polyisocyanate compound, the blocked prepolymer compound being a prepolymer compound blocked with a blocking agent, the prepolymer compound being a reaction product of tetramethylxylene diisocyanate and a polyol and having a Gardner-Holt viscosity of not greater than about X to about Y, the prepolymer compound being blocked with a blocking agent to provide the blocked prepolymer compound the blocking agent being selected from the group consisting of methyl ethyl ketoxime and diisobutyl ketoxime, the polyisocyanate compound being blocked with the blocking agent to provide the blocked polyisocyanate compound, the polyisocyanate compound being selected from the group consisting of the trimer of hexamethylene diisocyanate and the biuret of hexamethylene diisocyanate.

19. The method as recited in claim 18 wherein the blocking agent is methyl ethyl ketoxime.

20. The method as recited in claim 18 wherein the polyol is selected from the group consisting of polycaprolactone polyol, dimethylol propane, trimethylol ethane, neopentyl glycol, cyclohexanedimethanol, trimethyl propanediol 1, 4 butanediol and trishydroxyethylisocyanurate.

21. A method as recited in claim 20 wherein the blocking agent is methyl ethyl ketoxime and the polymer is a polyester.

* * * * *